United States Patent [19]

Howard

[11] 4,440,719

[45] Apr. 3, 1984

[54] STEAM DRIVEN WATER INJECTION

[75] Inventor: Robert W. Howard, San Jose, Calif.

[73] Assignee: General Electric Company, San Jose, Calif.

[21] Appl. No.: 310,928

[22] Filed: Oct. 13, 1981

[51] Int. Cl.³ .......................... G21C 15/00; F04F 5/22
[52] U.S. Cl. .................................... 376/372; 376/392; 376/407; 417/164; 417/166
[58] Field of Search ............... 376/372, 392, 407, 298, 376/299, 277, 282; 417/79, 164, 166

[56] References Cited

U.S. PATENT DOCUMENTS

| 88,620 | 4/1869 | Friedmann | 417/79 |
|---|---|---|---|
| 165,843 | 7/1875 | Little | 417/164 |
| 234,157 | 11/1880 | Wohlers | 417/164 |
| 270,937 | 1/1883 | Desmond | 417/151 |
| 272,463 | 2/1883 | Norwood | 417/164 |
| 334,597 | 1/1886 | Marsh | 417/164 |
| 722,696 | 3/1903 | Gree | 417/164 |
| 1,777,239 | 9/1930 | Weir | 417/164 |
| 1,810,873 | 6/1931 | Sim | 417/164 |
| 2,808,195 | 10/1957 | Boehm | 417/164 |
| 2,852,922 | 9/1958 | Neumann et al. | 417/164 |
| 3,380,649 | 4/1968 | Roberts | 376/372 |
| 3,431,168 | 3/1969 | Kiemtrup | 376/299 |
| 4,051,892 | 10/1977 | Reinsch | 376/299 |
| 4,280,796 | 7/1981 | Reinsch | 376/298 |

OTHER PUBLICATIONS

Penberthy Houdaille, Jet Pump Application Guide, 11/77.
Penberthy Houdaille, Technical Data, Automatic Injector, 9/77.
Penberthy Houdaille, Direct Reading Liquid Level Gages and Valves, 6/78.
Penberthy Houdaille, Jet Pump Technical Data, Pumping Liquids, 3/76.

*Primary Examiner*—Sal Cangialosi
*Attorney, Agent, or Firm*—Ivor J. James, Jr.; Samuel E. Turner; Raymond G. Simkins

[57] ABSTRACT

The multistage injection of water into the pressure vessel of a nuclear reactor including the steam-driven injection of water using steam generated by the reactor, the stages of injection subject to the cooling of water heated by the steam, whereby the pressure level of the water injected is boosted in stages.

2 Claims, 2 Drawing Figures

STEAM DRIVEN WATER INJECTION

BACKGROUND

This invention relates to the steam-driven injection of water into a vessel and more particularly relates to the cooling of water subject to multiple-stage steam-driven injection into the pressure vessel of a nuclear system.

Pressure vessels in nuclear reactors may operate at pressures in excess of 1,000 psi in the course of generating steam for power production. It is desirable to employ the steam generated within the pressure vessel to insure the presence of an ample supply of cooling water in the core of the nuclear system.

Presently, as for example shown in U.S. Pat. No. 3,431,168 (which relates to an invention by J. E. Kjemtrup, was issued on Mar. 4, 1969, and is expressly referred to and incorporated herein, a sufficient water level within the pressure vessel is insured by employing a turbine-driven pump which is an expensive and complex assembly of components including a steam-driven turbine rotating a shaft for driving the pump. In other arrangements, the pump is driven by an electric motor which requires substantial active controls and depends upon electrically operated speed governing equipment for operation. The pump is accordingly subject to failure during a loss of electric power.

In the past, and as shown in U.S. Pat. No. 722,696, issued to W. W. Green on Mar. 17, 1903, a form of multiple-stage steam-driven injection of water into vessels has been accomplished.

However, in such kinds of steam-driven water injection, irrespective of whether the stages are arranged in series or parallel or combinations thereof, the output of each stage produces heated water, which reduces the efficiency of subsequent stages.

OBJECTS OF THE INVENTION

Accordingly, it is an object of this invention to provide a passive, or non-electrically operated multi-stage steam-driven water injection system for supplying water to the pressure vessel of a nuclear system that is not subject to electrical failure, since it can be selectively and manually controlled.

Another object of the instant invention is to cool the water departing from selected steam-driven stages of a multiple-stage water injection system.

It is a further object of the present invention to supply water to the pressure vessel of a nuclear system by employing an injection or water supply system that is inexpensive, uncomplicated, and simple to maintain.

SUMMARY

The invention calls for stepwise increasing the pressure level of cooling water available from one or more of various containers such as for example the fuel pool, the suppression pool, or the condensate tank of a nuclear system. The increased pressure level is required to overcome the back pressure of the pressure vessel into which the water is sought to be injected and which operates at pressures of about 1,000 psi or above. The desired output pressure level of the injection system is attained in stages by employing steam generated in the pressure vessel itself. Two steam-driven water injectors are arranged in series with a cooling device such as for example a heat exchanger cooling the water flowing therebetween. A jet pump initially receives the water from one or more of the containers to which reference has already been made. Feedback water from the output of the first steam-driven water injector is cooled and propels the input water through the jet pump and into the first steam injector.

BRIEF DESCRIPTION OF THE DRAWING

The exact nature of the invention as well as objects and advantages thereof will be readily apparent from consideration of the following drawing in which.

DESCRIPTION OF THE PREFERRED EMBODIMENT

Figure 1:
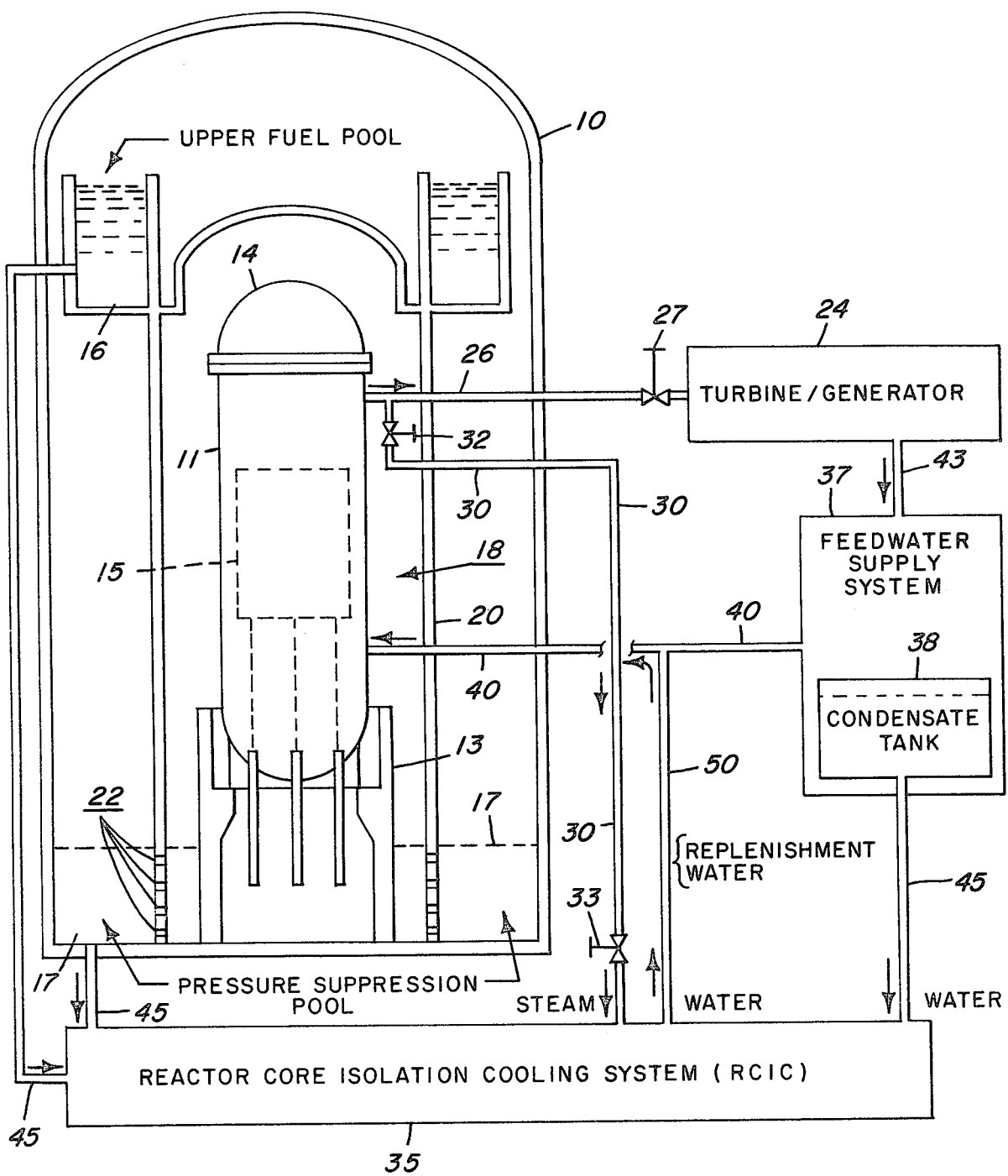
FIG. 1 shows a schematic diagram of a direct cycle boiling water reactor (BWR) system.

FIG. 1 shows pertinent features of a direct cycle boiling water reactor (BWR) system. The invention is however applicable to other kinds of reactor systems as well. Various examples of such systems are shown in the book *Nuclear Power Plants* by R. L. Loftness, published in 1964 by Van Nostrand Company.

Reactor systems typically include a containment structure 10 for structural protection. Within the containment 10, a pressure vessel 11 is suitably mounted on a pedestal 13. The pressure vessel 11 includes a head 14, which can be removed to refuel the reactor and give access to the reactor core 15. Reactor fuel destined for or removed from the core is temporarily stored underwater in a suitable upper fuel pool 16 containing demineralized water and located in the containment building. The containment 10 also holds a pressure suppression pool 17 for condensing steam in the unlikely event of certain kinds of postulated reactor accidents. The suppression pool 17 is suitably filled with water. One such accident involves the leakage of steam from the pressure vessel 11 within a drywell 18 of the reactor, which is bounded by suitable walls 20 defining underwater openings 22 in the suppression pool 17. A suitable pressure suppression system including a suppression pool is shown and described by C. P. Ashworth et al in an article entitled "Pressure Suppression," Nuclear Energy, August 1962, pages 313 through 321.

The reactor generates steam which drives a turbine/generator combination 24 for producing electricity used by consumers and to some extent by nuclear installation itself. The steam generated by the reactor travels to the turbine/generator 24 along at least a single pipe or line 26, the flow through which is suitably controlled as for example by one or more valves, as in indicated at 27. A branch 30 of line 26 extends through suitable valves 32 and 33, the walls 20 of the drywell 18, and the containment 10, and carries steam to a Reactor Core Isolation Cooling (RCIC) system 35 to which the invention disclosed herein relates.

The generation of steam in the reactor reduces the inventory of cooling water within the pressure vessel 11. The water within the pressure vessel can be said to "cool" the reactor fuel in the core 15, or the nuclear fuel can be considered to heat the water in the pressure vessel. The loss of water from the pressure vessel due to steam generation can be understood in terms of a "phase change" between the liquid and gaseous phases of materials.

The water lost during steam production is replenished during reactor operation by a feedwater supply system 37 which includes a condensate tank 38. During normal operation this replacement water is transported to the pressure vessel by a suitable feedwater pump (not shown) operating through a pipe or line 40 extending to the pressure vessel 11 from a condensor (not shown). If the feedwater supply system 37 becomes unavailable, the RCIC substitutes for it long enough to permit complete reactor shutdown and depressurization of the vessel 11 from its normal operating pressure in excess of about 1,000 psi.

Figure 2:
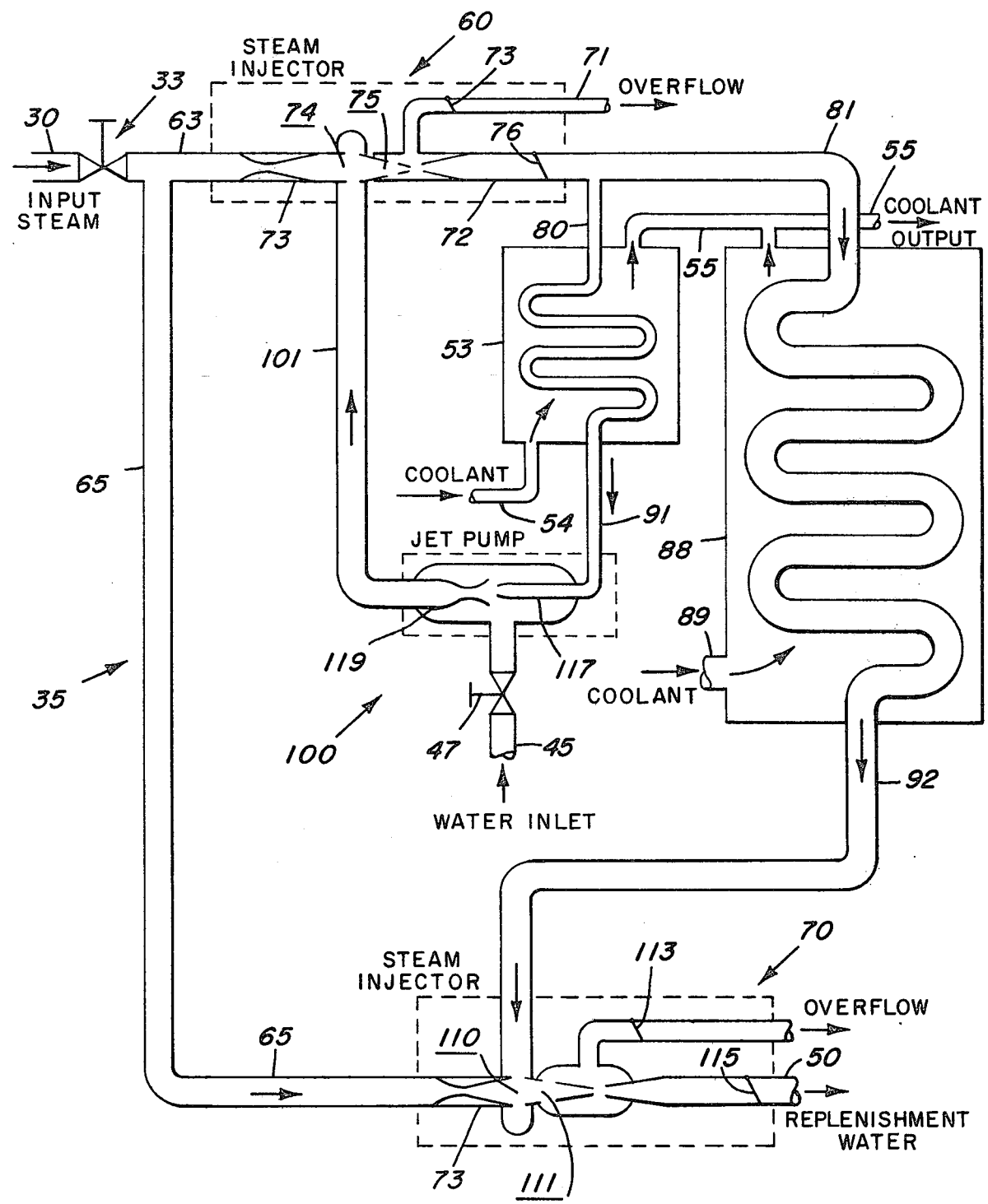
FIG. 2 is a schematic illustration of a preferred embodiment for carrying out the instant invention.

The details of the normal operation of the feedwater supply system 37 and the features of its construction as well as its connection and interaction with the turbine/generator 24 by for example a pipe or line 43 are well known in the art. This is also true of the condensate tank 38 which holds water available to supply the condensor (not shown) of the feedwater supply system 37 in the course of normal operation. The water from the condensate tank 38, is also available (as is water from the upper fuel pool 16 and the suppression pool 17) to the RCIC by means of pipes or lines 45. As can be seen in FIG. 2, these lines 45 provide an inlet for water to a suitable valve 47. Other valves (not shown) may be employed to determine which of the various sources of water (condensate tank 38, supression pool 17, or fuel pool 16) or which combination of them will actually be employed to supply the water. In general, the various valves referred to above may be operated manually or may be governed by a suitable valve control unit or units (not shown), which are responsive to the liquid level of coolant in the reactor vessel 11 or an indication of the non-availability of the feedwater supply system 37.

As will be shown, the steam generated by the reactor and passing through the branch 30 of the steam line 26 of the reactor system is employed to feed back the water to the reactor pressure vessel 11 for replenishment. This feedwater flows through a pipe or line 50.

Some RCIC systems presently known and operating employ features such as those shown in U.S. Pat. No. 3,431,168 by J. E. Kjemtrup and issued in 1969. The patent indicates the provision of a turbine pump which supplies stored water to the reactor vessel to maintain the coolant level. The turbine shown is steam operated, and independent of the possible loss of electric power at plant site. However, the RCIC system of this invention includes jet pump and injector stages and cooling means or heat exchangers as will be explained hereinafter.

A heat exchanger 53 is for example coupled to the output of the steam-driven injector 60, which drives a fluid such as water by applying steam from the reactor to it. Such an injector is commercially available from Pemberthy Corporation, and pertinent details of its operation will be provided hereinafter to permit a fuller understanding of the art involved in this invention. The heat exchanger 53 utilizes a suitable cooling medium for example low temperature water as a working fluid, which enters the heat exchangers 53 at an opening 54 and departs at an output 55. Convective forces, pump or other driving means (not shown) causes the cooling medium to flow through the heat exchanger 53.

The heat exchanger 53 may be one of a variety of heat transfer devices available on the market to remove heat from a fluid traveling in a tube, pipe, or line. No specific model or type is recommended for application herewith. The details of such a selection fall well within the competence of one skilled in the art.

The heat exchanger 53 taken in combination with the steam driven injector 60 can be considered to be a single stage of the injection system described. Valve 33 controls the application of steam from the reactor to respective branches of suitable pipes or lines 63 and 65. Pipe 63 leads steam to the steam input side of steam-driven injector 60. Pipe 65 provides steam to another or second steam-driven injector 70.

The injectors 60, 70 exhibit similar features. In particular each includes input apertures for steam and water. Accordingly, inlets are provided for each injector: one for water, and one for steam. On the output side of injector 60, there is a drain or overflow pipe or line 71. A main output line 72 is utilized in normal operation to permit the discharge of water. During start-up and during operation, a suction force is created within each steam-driven injector by passing high pressure steam through an expansion nozzle. The expansion nozzle causes the high pressure inlet steam to be accelerated to supersonic velocity at subatmospheric pressure. The subatmospheric pressure causes the water to begin to pass through the injector in a suction chamber 74, and condensation of the high velocity steam in a condensation region 75 creates a high velocity fluid stream that produces a secondary suction effect in an after-region of the injector, which in turn shuts a check valve on the overflow or drain line and directs flow through the main output line 72.

Considering only the first steam injector 60, steam is introduced at its steam inlet and flows through the suction chamber 74. The steam then passes through the condensation region 75 and initially departs through a drain check valve 73, into a suitable external region (not shown) adapted to accept overflow from the RCIC. The output of the injector 60 flows through a check valve 76 and respective branches of suitable pipes or lines 80 and 81 to convey output water to the appropriate ones of the components shown in FIG. 2.

In particular, line 80 leads to heat exchanger 53 and line 81 leads to a heat exchanger 88, which has an inlet 89 for coolant and an outlet 55. Respective heat exchangers 53, 88 connect with outpit lines or pipes 91, 92 which are respectively coupled to a jet pump 100 and to steam injector 70. The output of the jet pump 100 provides water to the suction chamber 74 of the injector 60 through a line or pipe 101. The jet pump 100 has an inlet to receive water from any of lines 45 through valve 47.

Steam injector 70 has a suction chamber 110, a condensation region 111, an overflow or drain check valve 113, and a main check valve 115. Its features are accordingly generally similar to those of steam injector 60.

Suitable steam injectors and a jet pump for application to this invention may be obtained from the Pemberthy Division of Houdaille Industries in Illinois. For example, a pair of Pemberthy Automatic Injectors, and a jet pump of the LL, LM, or LH model series may be employed.

The steam injector is considered to be a two-phase device, since it injects a liquid (i.e., water) by use of a gas (i.e., steam) and involves the conversion of the gaseous phase to a liquid phase upon condensation during its passage through the injector. The jet pump is of course a single-phase device, since water injected into other water involves only a single (the liquid) phase of $H_2O$.

In the jet pump 100, water under high pressure from injector 60 through heat exchanger 53 is driven through a nozzle 117 of the pump, establishing a suction effect tending to draw water through valve 47. The nozzle 117 produces a high velocity stream of water to establish low pressure within the pump 100, which creates the desired suction. On the discharge or output side of the pump 100, there is a diffuser 119, shaped to reduce flow velocity and gradually boost pressure while minimizing energy losses. Further information regarding such pumps is available in Igor J. Karassik et al, *Pump Handbook* by McGraw Hill, published in 1976.

Operation is initiated by turning on the steam at valve 33, whereby steam received from pressure vessel 11 (FIG. 1) flows through steam injectors 60 and 70 and exits through respective check valves 73, and 113. Introduction of water into both of these injectors 60, 70, by turning on valve 47, establishes condensation in the respective condensation regions 75 and 111, which produces a low pressure in the after-region, thereby closing the check valves 73, 113 and permitting an output through respective check valves 76, 115. A portion of the output of injector 60 is fed back through branch line 80 and jet pump 100. This provides higher pressure water to the suction chamber 74 and boosts the output pressure level of the first injector 60. The efficiency of the first injector 60 is maintained, by cooling the steam-heated water at the output of the injector 60 with heat exchanger 53 prior to introduction of the water into suction chamber 74 through jet pump 100. Without the heat exchanger 53, the overall output pressure level of the first injector 60 would be reduced.

Water from the output of the first injector 60 is carried through pipe or line 81 to heat exchanger 88 and thence through a line 92 to second injector 70. Cooling of the water by heat exchanger 88 permits the second injector 70 to operate at an acceptably high efficiency level. Output water from second injector 70 is supplied to line 50 at an output pressure in excess of about 1,000 psi—enough to overcome the back pressure offered by the reactor and to permit the injection of replenishment water thereinto.

The above description pertains to a single possible embodiment of the instant invention and is susceptible of reasonable modification by those skilled in the art. However, this invention is not meant to be limited to the preferred embodiment shown and described. Rather the claims set forth the invention and they are intended to cover all modifications reasonably within the spirit and scope of the invention.

What is claimed is:

1. In a nuclear system including a pressure vessel containing a nuclear reactor core for generating steam, an injection system for supplying water through a return pipe of the pressure vessel, said injection system comprising first and second steam-driven water injectors for driving water, each of them including an inlet and an output for water and effective for raising water pressure between inlet and output; first pipe means for applying steam from said vessel to said first injector; second pipe means for connecting the output of said first injector to the inlet of the second injector, the output of said second injector being effective for feeding water into said return pipe of the pressure vessel; first cooling means for cooling water passing through said second pipe means, said first cooling means being in thermal communication with said second pipe means; jet pump means for receiving input water from a source of water and effective for directing it to the inlet of said first injector, said second pipe means including a branch effective for diverting a portion of the water flowing from the output of said first injector to said jet pump means wherein said portion of water is effective for entraining water from said source of water for introduction into the inlet of said first injector; and second cooling means for cooling said portion of water in the branch of said second pipe means and subject to thermal communication with said branch, whereby the operational capability of said injection system for raising the pressure level of water in said return pipe is increased.

2. In a nuclear steam supply system including a pressure vessel containing a nuclear reactor core for generating steam, a method for supplying water to said pressure vessel through a return pipe including the steps of: boosting the pressure level of water from a source of water in a first injector driven by steam from said pressure vessel; cooling the water departing from said first injector; boosting the pressure level of the water from said source to said first injector in a jet pump driven by a first portion of the cooled water from said first injector; additionally boosting the pressure level of the remaining portion of the cooled water from said first injector in a second injector driven by steam from said pressure vessel; and directing the water departing from said second injector through said return pipe to said pressure vessel.

* * * * *